US012594213B2

(12) United States Patent
Lin et al.

(10) Patent No.: US 12,594,213 B2
(45) Date of Patent: Apr. 7, 2026

(54) BREAST MASSAGE DEVICE

(71) Applicant: Shenzhen Lute Jiacheng Supply Chain Management Co., Ltd., Shenzhen (CN)

(72) Inventors: Chusheng Lin, Shenzhen (CN); Rongjun Li, Shenzhen (CN)

(73) Assignee: Shenzhen Lute Jiacheng Supply Chain Management Co., Ltd., Shenzhen (CN)

(*) Notice: Subject to any disclaimer, the term of this patent is extended or adjusted under 35 U.S.C. 154(b) by 702 days.

(21) Appl. No.: 17/988,194

(22) Filed: Nov. 16, 2022

(65) Prior Publication Data

US 2024/0122788 A1 Apr. 18, 2024

(30) Foreign Application Priority Data

Oct. 14, 2022 (CN) ......................... 202222718033.2

(51) Int. Cl.
*A61H 15/00* (2006.01)
*A61H 15/02* (2006.01)

(52) U.S. Cl.
CPC ......... *A61H 15/0085* (2013.01); *A61H 15/02* (2013.01); *A61H 2015/0042* (2013.01); *A61H 2015/0071* (2013.01); *A61H 2201/0228* (2013.01); *A61H 2205/082* (2013.01)

(58) Field of Classification Search
CPC ................ A61H 15/0085; A61H 15/02; A61H 2015/0042; A61H 2015/0071; A61H 2201/0228; A61H 2205/082
See application file for complete search history.

(56) References Cited

U.S. PATENT DOCUMENTS

| | | | | | |
|---|---|---|---|---|---|
| 6,102,875 | A * | 8/2000 | Jones | A61H 15/0085 601/19 |
| 2002/0198478 | A1* | 12/2002 | Tsai | A61H 15/0085 601/112 |
| 2008/0154161 | A1* | 6/2008 | Abbott | A61H 15/0092 601/129 |
| 2017/0100302 | A1* | 4/2017 | Depow | A61H 7/008 |
| 2021/0007926 | A1* | 1/2021 | Wang | A61H 1/0296 |
| 2023/0022993 | A1* | 1/2023 | Yu | A61H 23/006 |
| 2023/0355463 | A1* | 11/2023 | Cirillo-Schmidt | A61H 21/00 |

FOREIGN PATENT DOCUMENTS

CN 207203067 U * 4/2018

* cited by examiner

*Primary Examiner* — Justine R Yu
*Assistant Examiner* — Matthew R Moon
(74) *Attorney, Agent, or Firm* — Westbridge IP LLC

(57) ABSTRACT

Disclosed is a breast massage device, including: a housing, an outer rubber sleeve, a massage assembly including a massage head, and a control module. The outer rubber sleeve is sleeved on the housing, the massage assembly is mounted on the housing, the massage head is abutted against the outer rubber sleeve, the control module is electrically connected to the massage assembly, and the control module is mounted in the housing.

6 Claims, 5 Drawing Sheets

BREAST MASSAGE DEVICE

CROSS-REFERENCE TO RELATED APPLICATIONS

This disclosure claims priority to Chinese Patent Application No. 202222718033.2, filed on Oct. 14, 2022, the entire contents of which are incorporated herein by reference.

TECHNICAL FIELD

The present disclosure relates to the technical field of a massage device, and in particular to a breast massage device.

BACKGROUND

Both the breast hyperplasia and the excessive milk secretion after childbirth easily cause breast swelling and pain. Insufficient milk production after childbirth also plagues many women. All of the above problems can be alleviated or even solved by a breast massage. However, the skin of the breast is relatively fragile. When the existing breast massage device does a massage, the massage head directly contacts the breast, and the massage head tends to slide relative to the skin of the breast, to cause damage and wound infection to the skin of the breast.

SUMMARY

The main purpose of the present disclosure is to provide a breast massage device, aiming to improve the safety of the breast massage device.

To achieve the above purpose, the present disclosure provides a breast massage device, including: a housing, a massage assembly mounted on the housing, and a control module.

In an embodiment, an outer rubber sleeve is sleeved on the housing, the massage assembly includes a massage head abutted against the outer rubber sleeve, the control module is electrically connected to the massage assembly and mounted in the housing.

In an embodiment, the massage assembly further includes a motor, the massage head includes a massage wheel and a wheel frame, the massage wheel is rotatably connected to the wheel frame, the motor is used to drive the wheel frame to rotate, and a periphery of the massage wheel is abutted against the outer rubber sleeve.

In an embodiment, any one side surface of the housing is a massage surface, the massage surface is an arc surface.

In an embodiment, a heating film is mounted on an outside of the massage surface and electrically connected to the control module.

In an embodiment, a side edge of the massage surface is a scraping edge, and the scraping edge is an arc shape.

In an embodiment, the scraping edge is a rounded edge, and a position of the outer rubber sleeve corresponding to the scraping edge is a rounded edge.

In an embodiment, the breast massage device further includes a vibration motor mounted in the housing and electrically connected to the control module.

In an embodiment, the vibration motor is mounted at an end of the housing away from the massage assembly.

In an embodiment, a thickness of the outer rubber sleeve gradually decreases from an end close to the vibration motor to an end close to the massage assembly.

In an embodiment, the outer rubber sleeve is made of a liquid silicone material.

In the technical solution of the present disclosure, the massage head does not directly contact the skin but an outer rubber sleeve. The outer rubber sleeve is sleeved on the housing, so that the relative position of the outer rubber sleeve to the housing is fixed. Since the massage head directly contacts the outer rubber sleeve, it will only have relative friction with the outer rubber sleeve. After the outer rubber sleeve contacts the skin, the outer rubber sleeve does not need to rub against the skin. It only needs to conduct a relative movement between the massage head and the outer rubber sleeve, then the pressing position of the massage head on the skin can be changed, to realize the massage. During the above process, the skin will not be rubbed, which prevents the breast skin from being hurt due to friction, and improves the safety of the breast massage device.

BRIEF DESCRIPTION OF THE DRAWINGS

In order to illustrate the embodiments of the present disclosure or the technical solutions in the prior art more clearly, the following briefly introduces drawings in the description of the embodiments or in the prior art. Obviously, the drawings in the following description are only part of embodiments of the present disclosure. Other drawings can also be obtained by those skilled in the art according to the structures shown in these drawings without any creative effort.

Figure 1:
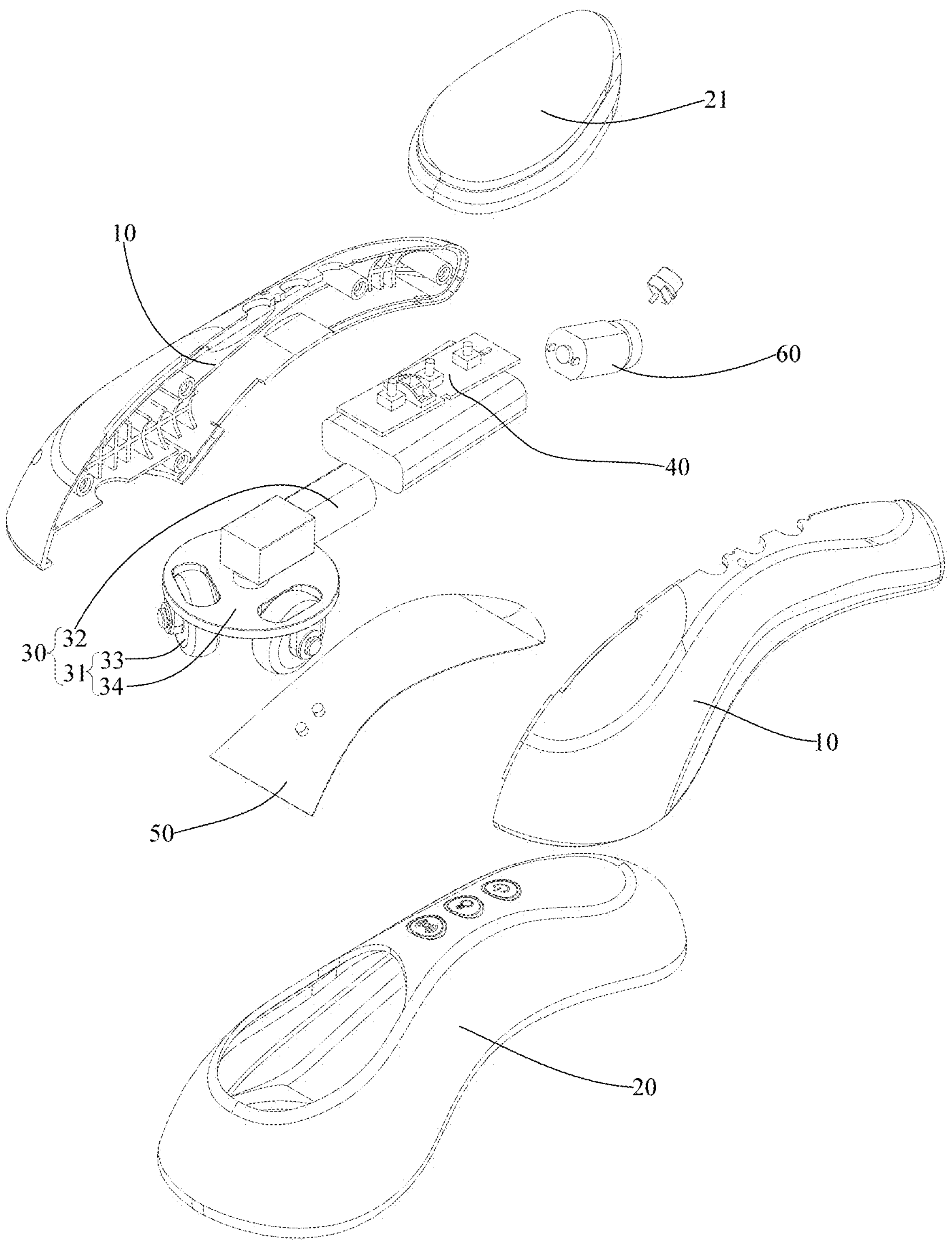
FIG. 1 is an explosive view of a breast massage device according to an embodiment of the present disclosure.

The achievement of the purpose, functional characteristics and advantages of the present disclosure will be further described with reference to the drawings in conjunction with embodiments.

DETAILED DESCRIPTION OF THE EMBODIMENTS

The technical solutions of the embodiments of the present disclosure will be described in more detail below with reference to the drawings. It is obvious that the embodiments to be described are only some rather than all of the embodiments of the present disclosure. All other embodiments obtained by those skilled in the art based on the embodiments of the present disclosure without creative efforts shall fall within the scope of the present disclosure.

It should be noted that all directional indications (such as up, down, left, right, front, back, etc.) in the embodiments of the present disclosure are only used to explain the relative positional relationship, the movement situation, etc. among various assemblies under a certain posture as shown in the drawings. If the specific posture changes, the directional indication also changes accordingly.

In addition, descriptions with “first”, “second”, etc. in the present disclosure are only for descriptive purposes, and should not be construed as indicating or implying their relative importance or implicitly indicating the number of indicated technical features. Thus, features defined with “first”, “second” may expressly or implicitly include at least one of features. In addition, the technical solutions of the various embodiments can be combined with each other, but must be based on the realization by those skilled in the art. When the combination of technical solutions is contradictory or cannot be realized, it should be considered that the combination of such technical solutions does not exist and is not within the scope of the present disclosure.

The present disclosure provides a breast massage device.

In an embodiment of the present disclosure, referring to FIGS. 1-4, the breast massage device includes: a housing 10, an outer rubber sleeve 20, a massage assembly 30 and a control module 40.

The outer rubber sleeve 20 is sleeved on the housing 10, the massage assembly 30 is mounted on the housing 10 and includes a massage head 31, the massage head 31 is abutted against the outer rubber sleeve 20, the control module 40 is electrically connected to the massage assembly 30, and the control module 40 is mounted in the housing 10.

The massage head 31 in the massage assembly 30 can be of various shapes, such as a pressing head capable of doing reciprocating motion, the pressing head can massage the breast by pressing. The pressing head can be driven by the motor 32, and a reciprocating motion of the mechanical component driven by the motor 32 belongs to the prior art, a reciprocating motion of a piston is driven by a motor. The outer rubber sleeve 20 can be provided with a rubber sleeve cover 21. When the breast massage device is assembled, the housing 10 can be mounted into the outer rubber sleeve 20, then be fixed by the rubber sleeve cover 21. The outer rubber sleeve 21 may be detachably connected to the outer rubber sleeve 20, so that it is convenient for users to replace the outer rubber sleeve 20. The rubber sleeve cover 21 can also be fixedly connected to the outer rubber sleeve 20 to increase the fixing effect of the outer rubber sleeve 20.

Figure 2:
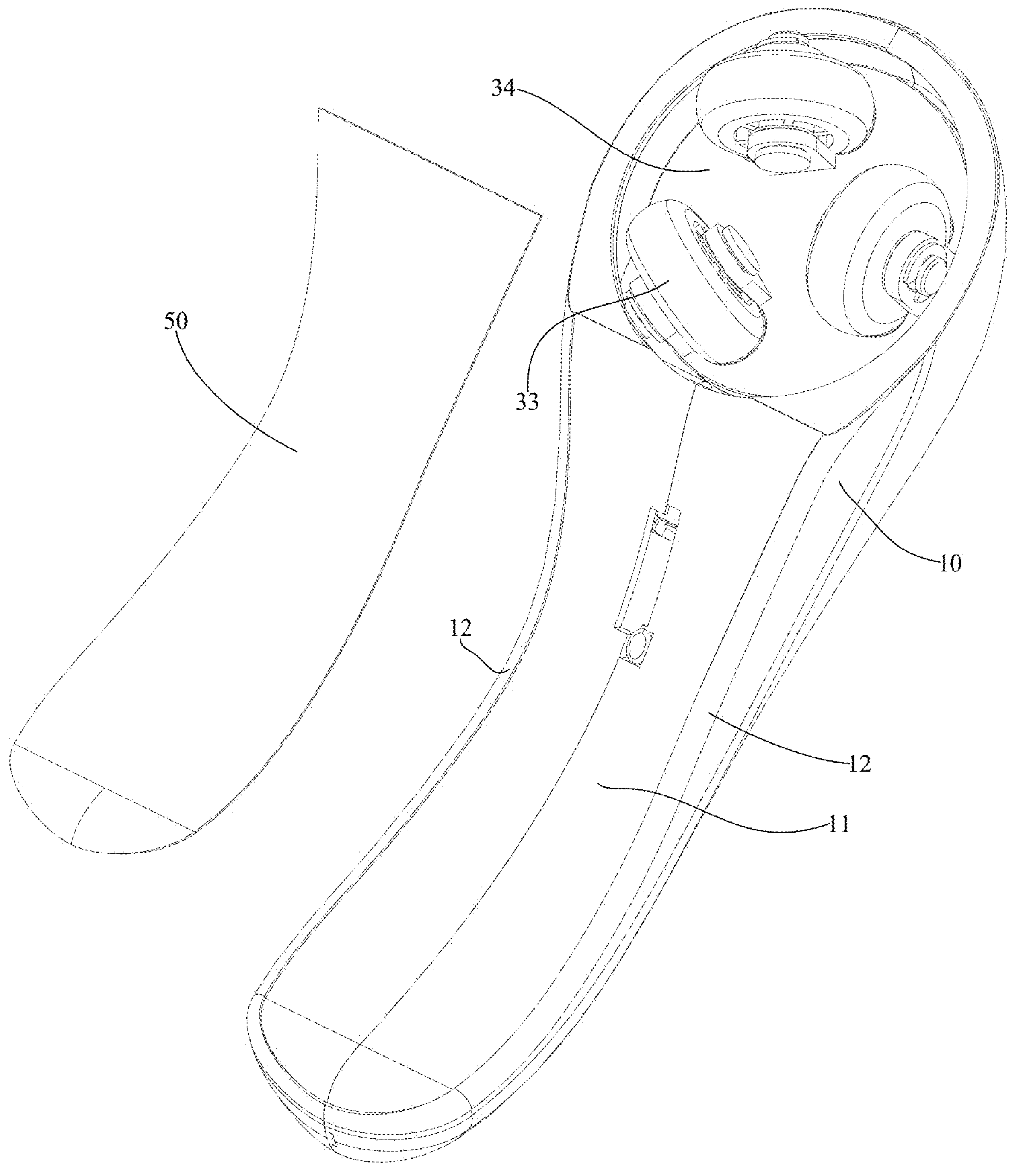
FIG. 2 is a schematic diagram of the breast massage device without an outer rubber sleeve according to the embodiment in FIG. 1.
Figure 3:
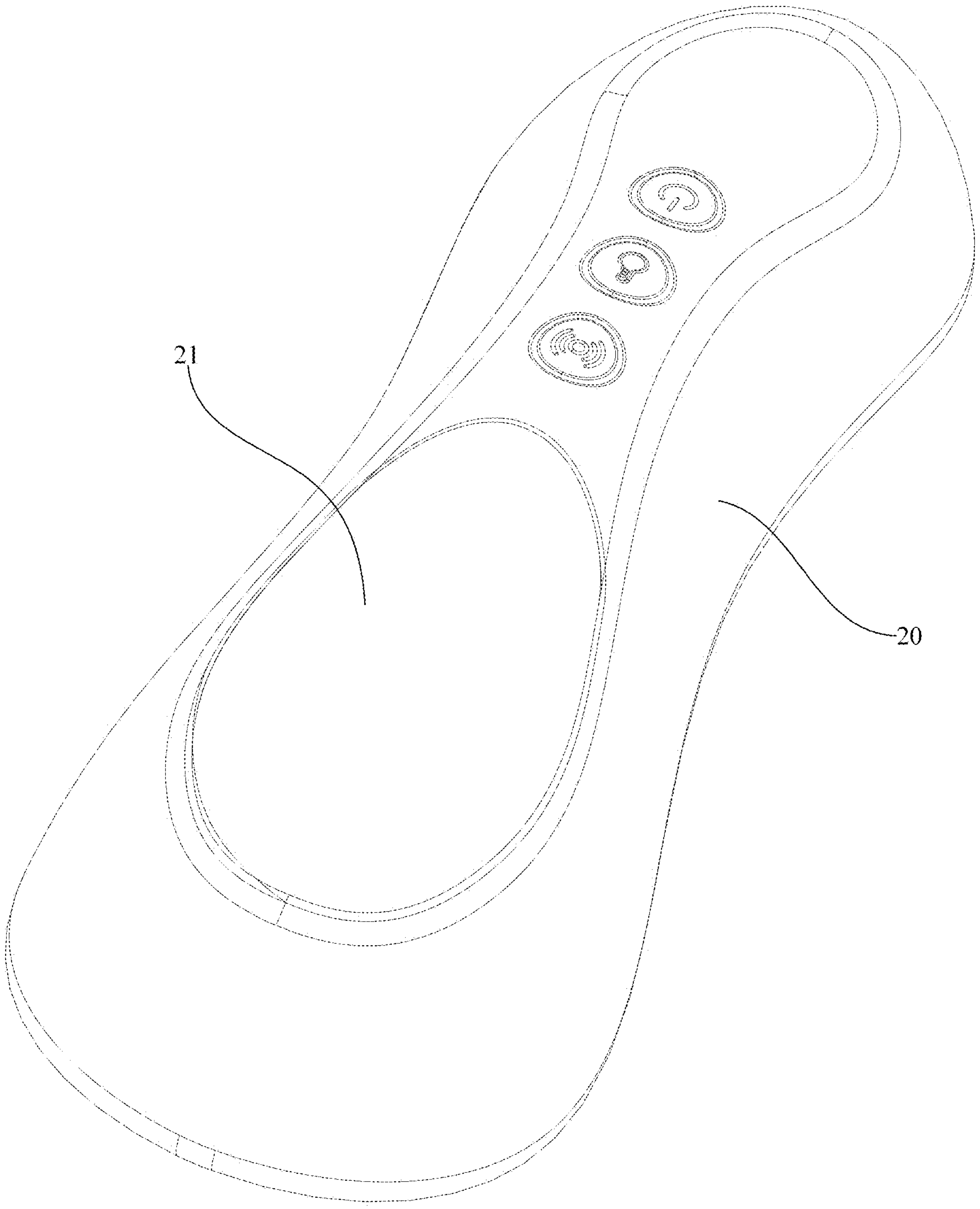
FIG. 3 is a schematic structural view of a breast massage device from one perspective of the embodiment in FIG. 1.

Referring to FIGS. 1-2, in an embodiment, the massage assembly 30 further includes a motor 32, the massage head 31 includes a massage wheel 33 and a wheel frame 34, the massage wheel 33 is rotatably connected to the wheel frame 34, the motor 32 is used to drive the wheel frame 34 to rotate, and a periphery of the massage wheel 33 is abutted against the outer rubber sleeve 20. The massage head 31 is driven by the motor 32, which is helpful for flexibly controlling the massage head 31. The control module 40 is electrically connected to the motor 32, and can control the motor 32 to realize a forward rotation, a reverse rotation, a uniform rotation or a non-uniform rotation, etc. In this way, the wheel frame 34 can rotate in different modes, to drive the massage wheel 33 to achieve massage with different effects. The motor 32 can be a deceleration motor, and an output speed of the deceleration motor is moderate and an output torque is large, which can better control the wheel frame 34. The periphery of the massage wheel 33 is abutted against the outer rubber sleeve 20, so that when the wheel frame 34 rotates, a rolling friction occurs between the massage wheel 33 and the outer rubber sleeve 20, which can also reduce a wear to the outer rubber sleeve 20 caused by the massage wheel 33.

Referring to FIGS. 1-2, in an embodiment, any one side surface of the housing 10 is a massage surface 11, and the massage surface 11 is an are surface. Since an outer surface of a breast is also generally an arc surface in a natural state, the massage surface 11 is the arc surface to increase a contact area with the breast and improve a massage effect. A plurality of massage protrusions can be provided on the massage surface 11. Users can press through the massage protrusions, or apply a lubricating oil on a skin or the massage surface 11 to massage by sliding.

Referring to FIGS. 1-2, in an embodiment, a heating film 50 is mounted on an outside of the massage surface 11, and the heating film 50 is electrically connected to the control module 40). A contact area between the massage surface 11 and the breast is large, so that it is suitable for heating massaging of the breast, which is facilitated by the heating film 50. The heating film 50 is electrically connected to the control module 40, and the control module 40 can control a heating power of the heating film 50, so that users can select a heating temperature according to their own needs.

Figure 4:
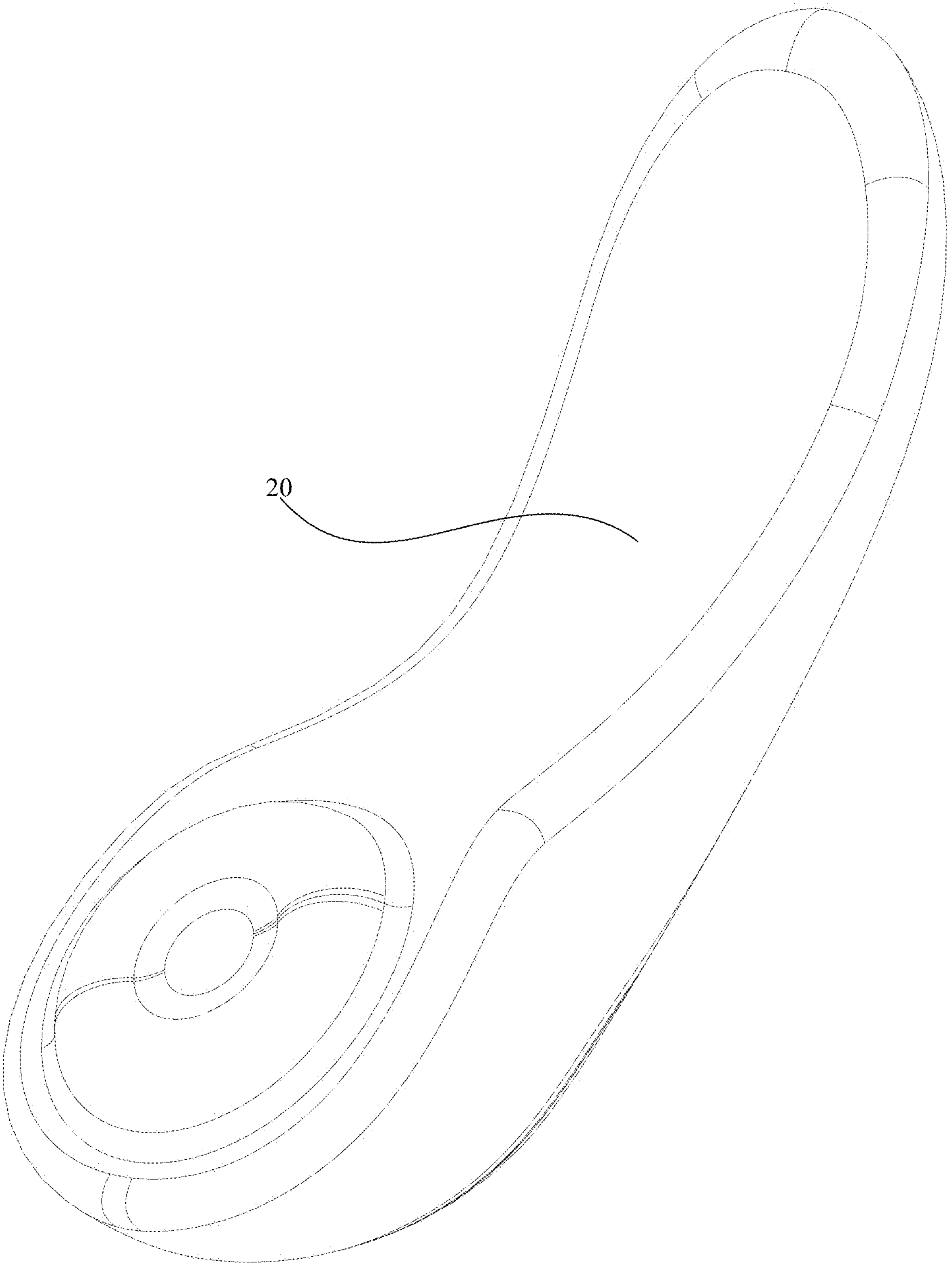
FIG. 4 is a schematic structural view of the breast massage device from another perspective of the embodiment in FIG. 1.

Referring to FIGS. 2 and 4, a scraping edge 12 is provided on the side of the massage surface 11 and is an arc shape. Scraping can also relieve breast tenderness and stimulate milk secretion. Since an outer surface of the breast is an arc shape, the scraping edge 12 of the arc shape can better fit the outer surface of the breast and improve the scraping effect. When using, the user can first apply a scraping oil on the breast or the scraping edge 12, and then scrape with a traditional scraping skill. A heating function during scraping can be turned on to make the heating film 50 to work, to improve the scraping effect.

Referring to FIGS. 2 and 4, in an embodiment, the scraping edge 12 is a rounded edge, and a position of the outer rubber sleeve 20 corresponding to the scraping edge 12 is a rounded edge. Since a skin of the breast is fragile, the rounded edge can prevent the breast from being scratched. In addition, the scraping edge 12 is located on a hard rubber shell, which can ensure a strength of scraping. The outer rubber sleeve 20 is soft, which can protect the breast skin to improve the user's experience.

Referring to FIG. 1, the breast massage device further includes a vibration motor 60 mounted in the housing 10 and electrically connected to the control module 40. Since the housing 10 is made of a hard material, a vibration generated by the vibration motor 60 can be transmitted to an entire breast massage device. When the vibration motor 60 is turned on, it can be used with the massage head 31, that is, when the massage head 31 is turned on for massage, since the vibration of the vibration motor 60 can also be transmitted to the massage head 31, the breast can get massaged at the same time. The vibration motor 60 can also be used in cooperation with the massage surface 11. Since the massage surface 11 has a large contact area with the breast, it can vibrate and stimulate a larger area of the breast to improve the massage effect. The vibration motor 60 can also be used in cooperation with the scraping edge 12, that is, the vibration motor 60 is turned on during scraping, to improve the scraping effect.

Referring to FIG. 1, in an embodiment, the vibration motor 60 is mounted at an end of the housing 10 away from the massage assembly 30. The vibration generated by the vibration motor 60 will be attenuated when transmitted far away. Therefore, a less vibration is transmitted to the massage assembly 30, to avoid interference with the work of the massage assembly 30, which also provides a more moderate vibration intensity at the massage assembly 30.

Figure 5:
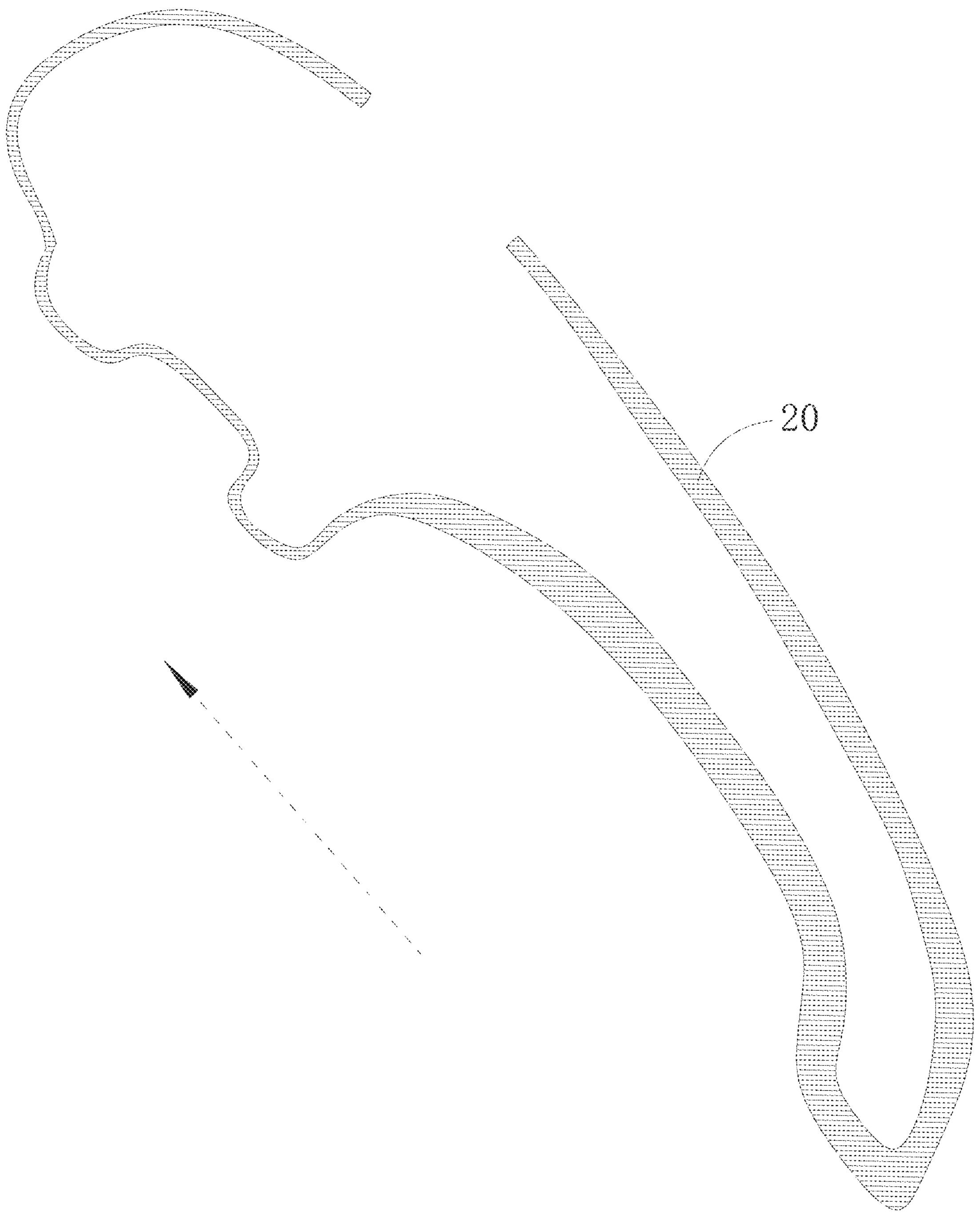
FIG. 5 is a schematic contour view of an outer rubber sleeve of the breast massage device according to an embodiment of the present disclosure.

Referring to FIGS. 1, 2 and 4, in an embodiment, a thickness of the outer rubber sleeve 20 gradually decreases from an end close to the vibration motor 60 to an end close to the massage assembly 30. That is, the thickness of the outer rubber sleeve 20 close to the vibration motor 60 is larger, to avoid an excessive amplitude at the vibration source or cause discomfort to the user. During the vibration transmission process, the vibration will be lost, so the vibration loss close to the massage assembly 30 is larger than that close to the vibration motor 60. Referring to FIG. 5, the thickness of the outer rubber sleeve 20 gradually decreases from an end close to the vibration motor 60 to an end close to the massage assembly 30, which provides a more even vibration effect.

Referring to FIGS. 1 to 4, in an embodiment, the outer rubber sleeve 20 is made of a liquid silicone material, which is very soft, thus the user's experience is improved. In addition, the liquid silicone belongs to a non-toxic material, which can improve the safety of the breast massage device.

The above are only some embodiments of the present disclosure, and are not intended to limit the scope of the present disclosure. Under the inventive concept of the present disclosure, any equivalent structural transformations made by using the description and drawings of the present disclosure, or direct/indirect application in other related technical fields are included in the scope of the present disclosure.

What is claimed is:

1. A breast massage device, comprising:

a housing;

an outer rubber sleeve sleeved on the housing;

a massage assembly mounted on the housing, wherein the massage assembly comprises a massage head abutted against the outer rubber sleeve;

a control module electrically connected to the massage assembly and mounted in the housing; and a vibration motor mounted in the housing and electrically connected to the control module;

wherein any one side surface of the housing is a massage surface, and the massage surface is an arc surface;

the vibration motor is in cooperation with the massage surface;

the vibration motor is mounted at an end of the housing away from the massage assembly; and a thickness of the outer rubber sleeve gradually decreases from an end close to the vibration motor to an end close to the massage assembly.

2. The breast massage device of claim 1, wherein the massage assembly further comprises a motor, and the massage head comprises a massage wheel and a wheel frame, the massage wheel is rotatably connected to the wheel frame, the motor is configured to drive the wheel frame to rotate, and a periphery of the massage wheel is abutted against the outer rubber sleeve.

3. The breast massage device of claim 1, wherein a heating film is mounted on an outside of the massage surface and electrically connected to the control module.

4. The breast massage device of claim 1, wherein a side edge of the massage surface is a scraping edge, and the scraping edge is an arc shape.

5. The breast massage device of claim 4, wherein the scraping edge is a rounded edge, and a position of the outer rubber sleeve corresponding to the scraping edge is a rounded edge.

6. The breast massage device of claim 1, wherein the outer rubber sleeve is made of a liquid silicone material.

* * * * *